(12) United States Patent
Pati (10) Patent No.: US 7,454,067 B1
(45) Date of Patent: Nov. 18, 2008

(54) SYMBOL CLASSIFICATION DEPENDING ON CLUSTER SHAPES IN DIFFERENCE IMAGE

(75) Inventor: Amar K. Pati, Purulia (IN)

(73) Assignee: Adobe Systems Incorporated, San Jose, CA (US)

( * ) Notice: Subject to any disclaimer, the term of this patent is extended or adjusted under 35 U.S.C. 154(b) by 1039 days.

(21) Appl. No.: 10/661,078

(22) Filed: Sep. 12, 2003

(51) Int. Cl.
*G06K 9/18* (2006.01)
*G06K 9/62* (2006.01)
*G06K 9/68* (2006.01)

(52) U.S. Cl. .................. 382/225; 382/182; 382/221

(58) Field of Classification Search ......... 382/182–187, 382/217–225
See application file for complete search history.

(56) References Cited

U.S. PATENT DOCUMENTS

| | | | | |
|---|---|---|---|---|
| 4,887,304 | A * | 12/1989 | Terzian | 382/209 |
| 5,548,326 | A * | 8/1996 | Michael | 348/87 |
| 5,640,200 | A * | 6/1997 | Michael | 348/87 |
| 5,673,332 | A * | 9/1997 | Nishikawa et al. | 382/128 |
| 5,850,466 | A * | 12/1998 | Schott | 382/141 |
| 5,859,968 | A * | 1/1999 | Brown et al. | 726/36 |
| 6,330,354 | B1 * | 12/2001 | Companion et al. | 382/150 |
| 6,963,425 | B1 * | 11/2005 | Nair et al. | 358/1.9 |
| 7,058,204 | B2 * | 6/2006 | Hildreth et al. | 382/103 |
| 7,095,878 | B1 * | 8/2006 | Taylor et al. | 382/118 |
| 7,162,073 | B1 * | 1/2007 | Akgul et al. | 382/149 |

OTHER PUBLICATIONS

Witten, Ian H., et al., "Managing Gigabytes," Chap. 7—Textual Images, 1994.
Goos, G., et al., "Lecture Notes in Computer Science," Pattern Recognition, 4th International Conference, Cambridge, U.K., Mar. 28-30, 1988, Proceedings.
Kia, Omid Ebrahimi, "Document Image Compression Analysis," http://documents.cfar.edu/LAMP/Media/Publications/Papers/okia97/okia97.html, Jul. 23, 1998.
"CCITT Compression," http://www.advent.co.uk/ccitt.html, Jan. 30, 1998.

* cited by examiner

*Primary Examiner*—Aaron W Carter
(74) *Attorney, Agent, or Firm*—Fish & Richardson P.C.

(57) ABSTRACT

Methods and apparatus, including computer program products, for classifying elements of a digital image. An element of the digital image and a prototype representing a class of elements are received and a difference image is generated. The difference image represents differences between the received element and the prototype and includes ON pixels that represent local differences between the received element and the prototype. The difference image includes one or more clusters of neighboring ON pixels. Relative arrangements of ON pixels are determined in the difference image. One or more scores are assigned to the difference image using the relative arrangements of ON pixels in the difference image. Based on the assigned scores, it is determined whether the received element belongs to the class represented by the prototype.

51 Claims, 5 Drawing Sheets

SYMBOL CLASSIFICATION DEPENDING ON CLUSTER SHAPES IN DIFFERENCE IMAGE

BACKGROUND

The present invention relates to digital image processing.

Digital images include digital data that represent graphics objects, e.g., geometrical objects (such as lines or shapes), picture data (such as photographs or paintings), and/or images of text (such as scanned documents). Graphics objects can be represented by bitmaps that specify raster arrays of closely spaced pixels, i.e., basic picture elements. Each pixel represents a local portion (i.e., a dot) of an image and is described in the bitmap by one or more bits specifying local graphical attributes, such as color or opacity. The number of pixels in an image is referred to as a resolution of the bitmap. Bitmaps are supported and used in many graphics applications, such as presentation, animation, painting or design applications. In addition, bitmaps can be generated and processed by scanning devices and digital cameras.

In a typical image, there can be correlations between pixels (e.g., within a shape or along lines) and repeated patterns and/or symbols (e.g., characters in a scanned image of text). The correlations and repetitions are used by compression techniques to generate representations that are more compact than a bitmap of the image. The compressed representations can be lossy or lossless depending on whether information is lost or not, respectively, from the original (uncompressed) image during the compression. Compressed representations include Joint Photographic Experts Group ("JPEG") format, Graphics Interchange Format ("GIF"), and Joint Bi-level Image Experts Group ("JBIG") format. For example, JBIG (or its versions, such as JBIG2 designed for the Internet) is a standard to represent bi-level images, where pixels can have only two levels (e.g., ON and OFF, or black and white).

In some compression techniques, repeated or closely resembling image elements, such as patterns or symbols, are identified and assigned to classes, where each class has a prototype. Differences between an image element and class prototypes are represented by clusters of pixels, and the image element is classified based on masses of the clusters (i.e., number of pixels in the clusters). The classification of the image elements can be used in a compressed representation. For example in a lossless representation, an image element can be represented by a corresponding class prototype and differences relative to the class prototype. In a lossy representation, differences between the image element and the prototype are lost and the class prototype is used in place of all image elements in the class.

In optical character recognition ("OCR") techniques, image elements representing characters are identified in an image and classified by corresponding character codes. Typically, the OCR system also identifies fonts used for the identified characters, and generates a text representation using the character codes and the identified fonts.

SUMMARY

Elements of a digital image are assigned to classes using techniques that are sensitive to shapes of clusters representing differences between the elements and prototypes of the classes. In general, in one aspect, the invention provides methods and apparatus, including computer program products, for classifying elements of a digital image. An element of the digital image and a prototype representing a class of elements are received and a difference image is generated. The difference image represents differences between the received element and the prototype and includes a plurality of ON pixels, where each ON pixel represents a local difference between the received element and the prototype. The difference image includes one or more clusters of ON pixels, where each cluster includes one or more neighboring ON pixels. Relative arrangements of ON pixels are determined in the difference image. One or more scores are assigned to the difference image using the determined relative arrangements of ON pixels in the difference image. Based on the scores assigned to the difference image, it is determined whether the received element of the image belongs to the class represented by the prototype.

Particular implementations can include one or more of the following features. One or more of the clusters of ON pixels can be identified in the difference image. Determining relative arrangements of ON pixels in the difference image can include, for each identified cluster, determining a relative arrangement of ON pixels in the cluster, where the determined relative arrangement specifies a shape for the cluster. Assigning one or more scores to the difference image can include assigning a score to each cluster based on the shape of the cluster. Assigning one or more scores to the difference image can include assigning a score to each ON pixel in the difference image. Assigning a score to each ON pixel can include assigning a score to each ON pixel based on a number of other ON pixels in a predetermined neighborhood of the ON pixel. Assigning a score to each ON pixel can include assigning a score to each ON pixel according to a monotonously increasing function of the number of other ON pixels in the predetermined neighborhood of the ON pixel. The monotonously increasing function can include an exponential function of the number of ON pixels in the predetermined neighborhood. The exponential function can be two to the power of the number of ON pixels in the predetermined neighborhood. Generating a difference image can include generating a difference image that includes one or more OFF pixels, where each OFF pixel represents lack of local difference between the received element and the prototype. Receiving an element of the digital image can include receiving a bitmap image element including neighboring pixels of the same bit value. Receiving a prototype can include receiving a bitmap of the prototype. Generating a difference image can include performing a Boolean exclusive-or operation of each pixel of the bitmap image element with the bitmap of the prototype.

A representation of the digital image can be generated. The generated representation can include a symbol map associating one or more elements of the digital image with the prototype of the class. If it is determined that the received element belongs to the class of the prototype, generating a representation of the digital image can include using the symbol map to represent the received element with the prototype of the class. Receiving a prototype representing a class of elements can include receiving a glyph representing a character. Determining whether the received element belongs to the class represented by the prototype can include determining whether the received element represents the character. If it is determined that the received element represents the character, a text representation can be generated using a character code of the character. Generating a text representation can include using a font that maps the character code to the glyph representing the character.

The invention can be implemented to realize one or more of the following advantages. Differences between image elements and class prototypes can be represented by clusters. The differences can be evaluated with a high efficiency using techniques that are sensitive to the shape of the clusters (i.e., relative arrangement of pixels in the clusters), instead of, or in addition to, the mass of the clusters (i.e., the number of pixels in the clusters). Compression efficiency can be increased. For example, elements of an image may be classified into fewer classes when classification is sensitive to cluster shapes, instead of only the cluster mass. In an image of text, the number of different classes can be reduced without increasing substitution error, i.e., without classifying characters with different glyphs into the same class. Differences between an image element and a class prototype can be represented in a difference image by ON and OFF pixels that represent presence and absence, respectively, of substantial local differences between corresponding portions of the image element and the class prototype. Difference images can be evaluated without identifying clusters and/or cluster masses. Processing time of the classification can be decreased using techniques that are sensitive to cluster shapes. These techniques can decrease processing time by assigning a smaller number of classes to elements of an image and/or classifying the elements without evaluating cluster masses. Cluster shapes can be taken into account by evaluating a predetermined neighborhood around each ON pixel in the difference image. For example, by considering the number of other ON pixels in a neighborhood of each ON pixel in the difference image, a compact cluster can be differentiated from a disperse cluster even if the compact and disperse clusters have the same mass. A cost function can be defined to evaluate the difference image such that the compact cluster has a significantly higher cost (i.e., represents a larger difference) than the disperse cluster.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
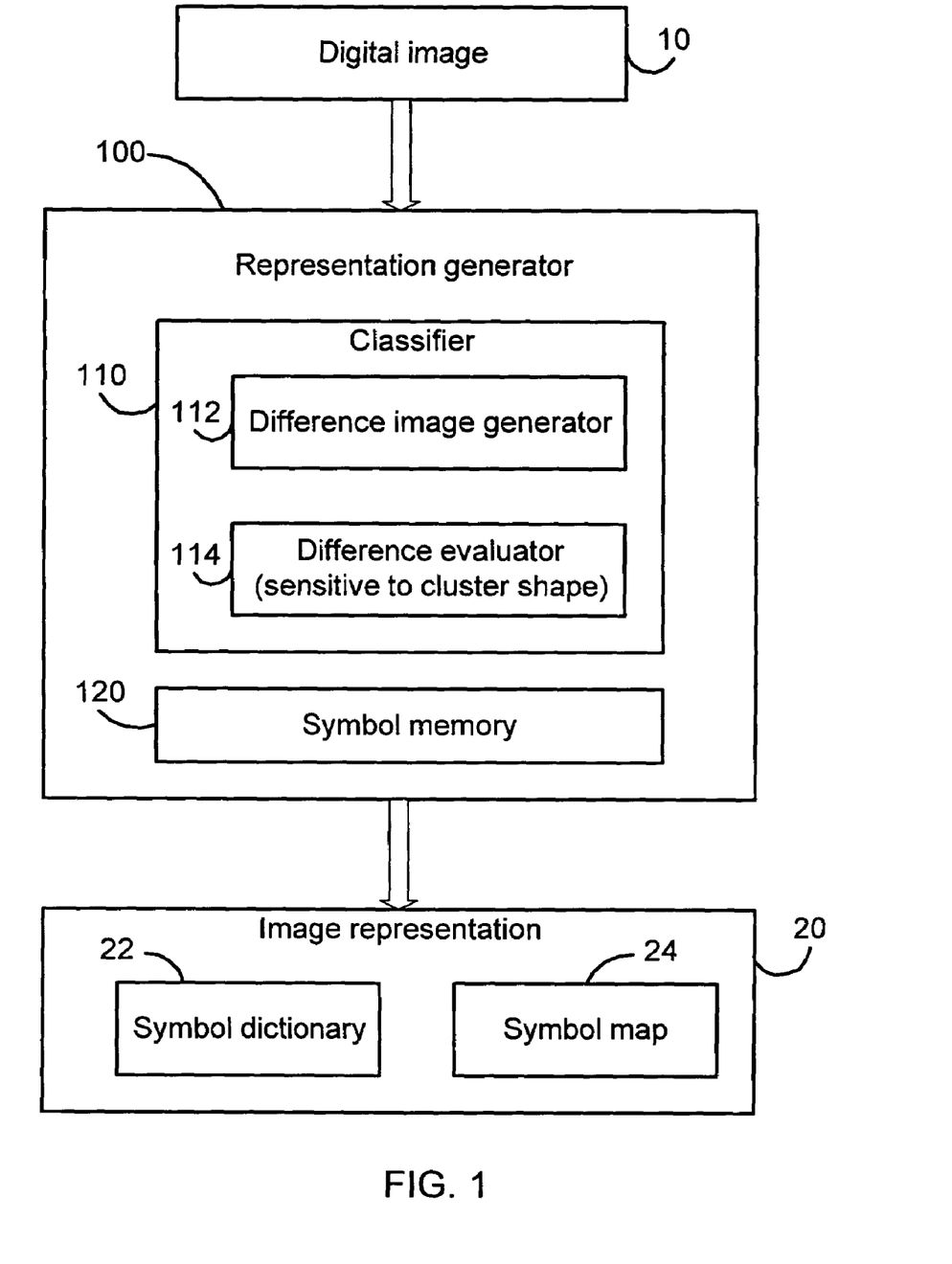
FIG. 1 is a schematic diagram illustrating an image representation generator.

FIG. 1 illustrates a representation generator 100 that receives a digital image 10 and generates an image representation 20 of the digital image 10. The representation generator 100 can be implemented in a computer system or any digital device that generates digital images, such as a scanner, facsimile machine, or digital camera.

The digital image 10 includes digital data that represents graphics. For example, the image 10 can include one or more bitmaps that specify graphics objects on a raster array of pixels. The digital image 10 can be represented by a single bitmap, or can include multiple bitmaps, e.g., each bitmap can represent a separate graphics object. The bitmaps in the image 10 can include one or more bi-level bitmaps, i.e., bitmaps that specify pixels with only two allowed values (e.g., representing on and off, or black and white), and/or bitmaps that specify gray-level or color pixels. Optionally, the digital image 10 can include vector graphics objects, i.e., graphics objects that are represented by geometrical formulas.

The digital image 10 can include repeated image elements that appear at multiple locations in the image, and have identical or substantially identical shape and mass. For example, the digital image can represent an image of a text that includes one or more repeated characters represented by the same glyph. That is, multiple image elements can correspond to the same glyph of a character repeated at different locations in the image. Even if the image elements actually represent the same glyph, the image elements at the different locations can be slightly different if the image of the text is distorted (e.g., due to imperfections, such as scanning errors, during an imaging process that has been used to create the image). For example, the same glyph can have a stem (i.e., vertical portion) that is slightly thicker, thinner, taller or shorter at different locations.

The representation generator 100 includes a classifier 110 and a symbol memory 120. The classifier 110 identifies image elements of the image 10 and classifies the identified elements into different classes. Each class has a prototype, i.e., a symbol that is used to represent essential features of members of the class. For example in a text image, class prototypes can include character glyphs that are preset (e.g., in optical character recognition applications) or generated from repeated characters in the image (e.g., in JBIG applications). The class prototypes, which can be represented by bitmaps or vector graphics objects, are stored in the symbol memory 120.

The classifier 110 includes a difference image generator 112 and a difference evaluator 114. The difference image generator 112 generates difference images that describe local differences between image elements and class prototypes. For example, a difference image can include a rasterized image, such as a bi-level image with ON and OFF pixels that indicate the presence and absence, respectively, of substantial local differences between an image element and a class prototype at corresponding locations. Alternatively, the difference image can include vector graphics objects that describe local differences without rasterization. For example, black and white areas in the difference image can indicate presence or absence of substantial differences between image elements and class prototypes. Optionally, the difference image can include gray scale or color values that indicate (e.g. they are proportional to) a degree of the differences. Techniques for generating difference images are discussed with reference to FIG. 3.

The generated difference images can specify one or more clusters. A cluster is defined by image portions (e.g., pixels) that have similar local properties and are direct neighbors or connected through neighboring portions of the cluster. For a bi-level difference image, the clusters can be specified by neighboring ON pixels. That is, a cluster can consist of ON pixels that are neighbors or can be connected through neighboring ON pixels, where two pixels are considered neighbors if they are within each others neighborhood, e.g., adjacent in a raster array (vertically, horizontally, and/or diagonally) or within a distance defined to specify the neighborhood. For a difference image represented by black and white vector graphics, the clusters can be specified by black (or alternatively, white) neighboring regions, i.e., continuous regions or regions that are within a predetermined distance of each other. For a gray scale or color difference image, clusters can be specified by ON image portions that have gray scale or color values that are above (or alternatively, below) one or more predetermined threshold values and are neighbors or connected through neighboring ON portions. For example, a cluster can include adjacent pixels or continuous regions where gray scale or color values are above the predetermined threshold values.

The generated difference images are evaluated by the difference evaluator 114 that is sensitive to shapes of clusters in the difference images. That is, the difference evaluator 114 is capable of differentiating (i.e., evaluating differently) two clusters that have the same mass but different shapes. For example, while a large compact cluster (such as a compact shape of ON pixels) typically indicates large characteristic differences, a large but disperse cluster of the same mass (such as a long line of ON pixels) can be a result of a small but systematic difference (such as a small difference in line thickness) between an image element and a class prototype.

The difference evaluator 114 calculates one or more characteristic values, e.g., scores, that characterize differences represented by the difference image, and assigns the characteristic values to the difference image. For example, the difference evaluator 114 can assign scores that depend on the shape of clusters in the difference image. The classifier 110 uses the characteristic values assigned to difference images to classify the corresponding image elements. By using characteristic values that depend on cluster shapes, the classifier 110 can recognize that a large but disperse cluster represents a small difference and classify the corresponding image element in the right class. Methods for classifying image elements are discussed in detail with reference to FIGS. 2-4.

The representation generator 100 uses the classification of the image elements to generate the image representation 20 of the digital image 10. For example, the image representation 20 can be a compressed representation (e.g., a JBIG2 representation), or a text representation using fonts to represent characters of the text (e.g., in OCR applications). The image representation 20 includes a symbol dictionary 22 and a symbol map 24. The symbol dictionary 22 includes symbols, such as class prototypes or character glyphs, that can be identified with a code according to an encoding. For example in a lossy representation, the symbol dictionary 22 can include and encode all class prototypes that are used to classify the elements of the image 10. In a lossless representation, the symbol dictionary 22 can include and encode symbols that characterize differences between class prototypes and the elements of the image 10.

The symbols and the encoding of the symbol dictionary 22 are mapped by the symbol map 24 to represent the digital image 10. The symbol map 24 specifies locations in the represented image and corresponding symbols of the symbol dictionary 22. For example, the digital image 10 can represent a text and the symbol dictionary 22 can include and encode all different character glyphs that correspond to the image elements representing the text. Optionally, for example in a text representation, the representation generator 100 can identify a font that is used to represent the text. Thus, the identified font can be used in place of the symbol dictionary 22 and the symbol map 24 can have a standard text file format.

Figure 2:
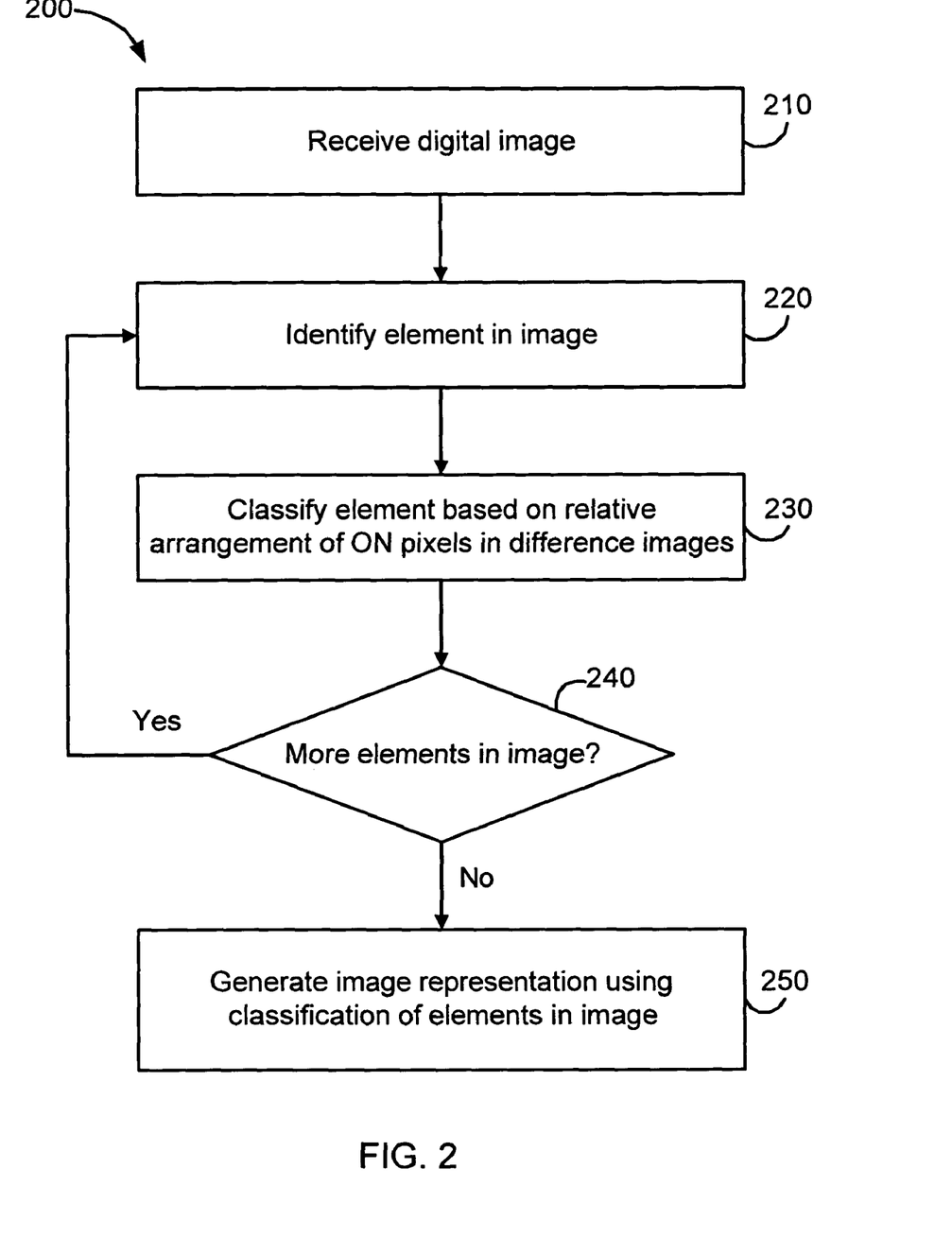
FIGS. 2-4 are schematic flow diagrams illustrating methods for generating image representations using classification of image elements.

FIG. 2 illustrates a method 200 for generating an image representation of a digital image. The method 200 can be performed, e.g., by a system that includes a representation generator, such as the representation generator 100 (FIG. 1).

The system receives a digital image (step 210). The digital image can be received from a storage device or directly from a device and/or computer application that generated the digital image, such as a scanning or a facsimile device, a digital camera, or a painting application. In one implementation, the received image includes one or more bitmaps, such as bi-level bitmaps. Alternatively or in addition, the image can include vector graphics objects.

The system identifies an element of the received image (step 220). For a bi-level bitmap that specifies the image with a raster array of black and white pixels, the system can identify a cluster of black pixels as an element of the image. (For gray level or color images, clusters can be specified by predetermined local thresholds, as discussed above with reference to FIG. 1.) In one implementation, the system specifies a bounding box around the cluster. Pixels that are outside the cluster but inside the bounding box can be represented in the bounding box with the same pixel value they have in the image, or with a predefined pixel value (e.g., representing an OFF or white pixel). For an image representing a text, the system can first identify bounding boxes surrounding characters in the text, and treat any object that is inside a bounding box as an image element.

The system classifies the element based on the relative arrangement of ON pixels in difference images (step 230). ON pixels in a difference image describe local differences between the element and a class prototype representing a class of image elements. The system characterizes each difference image with one or more characteristic values that are based on the relative arrangement of ON pixels in the difference image. Based on the characteristic values, the system assigns the element to a class, as discussed in more detail with reference to FIG. 3.

Figure 5:
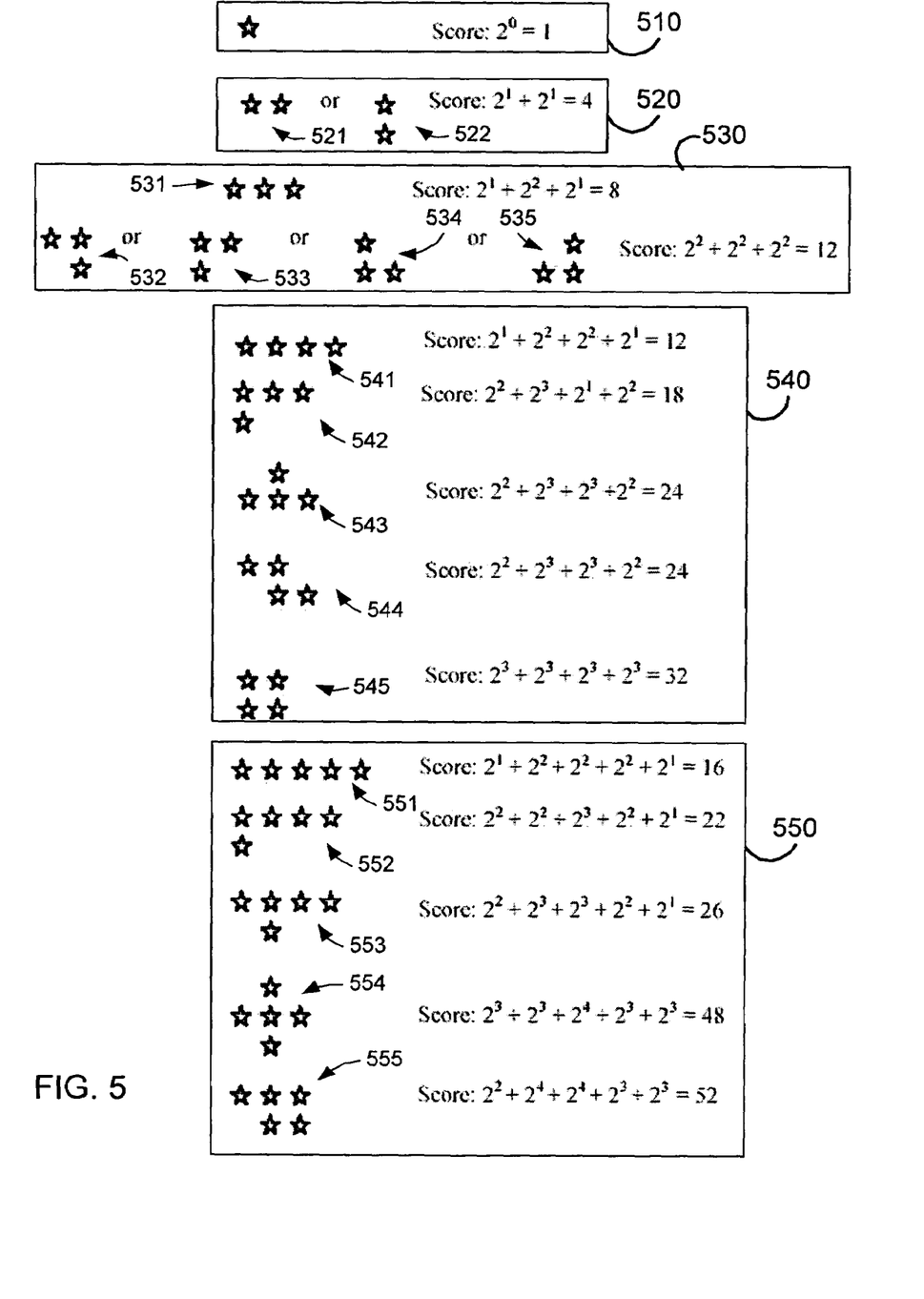
FIG. 5 is a schematic diagram illustrating examples of evaluating clusters.

The difference images can include difference clusters, i.e., clusters of ON pixels, where each difference cluster has a shape specified by the relative arrangement of ON pixels in the cluster. Because the difference image is characterized with characteristic values based on the relative arrangement of ON pixels, one or more of the characteristic values can be different if the difference clusters have the same mass but different shapes—that is, if the difference clusters include the same number of pixels for bitmaps or the same area for vector graphics, but the pixels or portions of the vector graphics are arranged differently. Optionally, the system can assign characteristic values to difference clusters. FIG. 5 shows examples of characterizing difference clusters based cluster shape.

The system verifies whether the received image includes elements that have not been classified (decision 240). For example, the system can keep a record identifying which portions of the image have been classified, and look for image elements in portions of the image that have not been recorded as classified portions. If the image includes one or more unclassified elements ("Yes" branch of decision 240), the system identifies one of these elements (i.e., returns to step 220).

If all elements of the image have been classified ("No" branch of decision 240), the system generates an image representation, such as a JBIG2 representation, that uses the classification of the elements in the image (step 250). For example as shown in FIG. 1, the generated representation can include a symbol dictionary and a symbol map, where the symbol dictionary specifies class prototypes that are used by the symbol map to represent the image.

Figure 3:
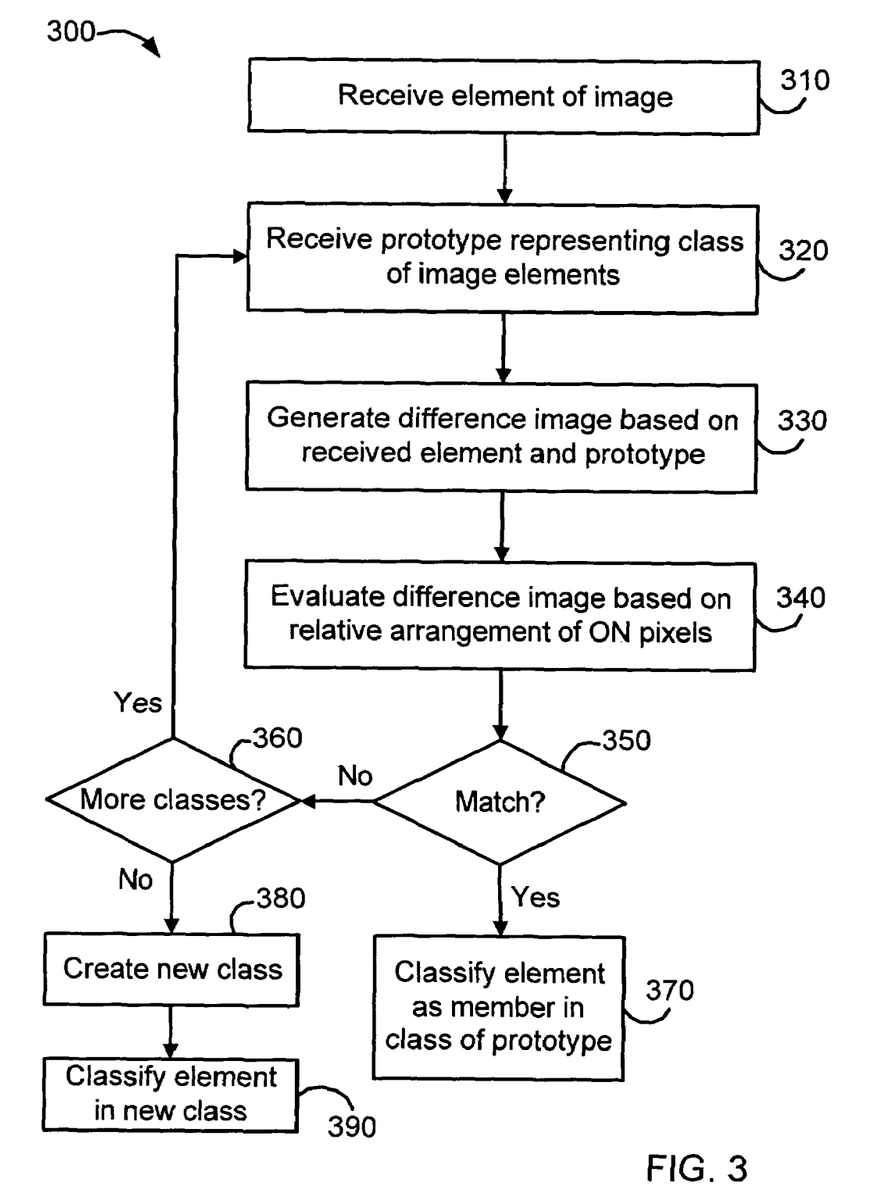

FIG. 3 illustrates a method 300 for classifying an element of an image. The method 300 can be performed, for example, by a system that includes a classifier, such as the classifier 110 shown in FIG. 1. The system receives an element of an image (step 310) and a prototype that represents a class of elements of the image (step 320). The received image element and the prototype can be specified by bitmaps, such as bi-level bitmaps, or vector graphics objects, or both.

The system generates a difference image based on the received image element and the prototype (step 330). The generated difference image includes ON pixels to characterize local differences between the image element and the prototype. In one implementation, both the image element and the prototype are specified by bi-level bitmaps that assign single bit values, i.e., binary zeros and ones, to pixels in a raster array. To generate a difference image, each pixel of the image element is associated with a corresponding pixel of the prototype. For example, the image element and the prototype can be aligned based on their corresponding bounding boxes. (If the bounding boxes have different sizes, the system can match them by adding or deleting background pixels that do not change the image element or the prototype.) Optionally, the system can calculate overlaps of the image element and the prototype for a number of different alignments and use the alignment with the largest overlap to generate the difference image. Pixel values for the difference image can be calculated by a Boolean XOR (i.e., exclusive or) operation that is performed with bit values specified for the corresponding pixels of the image element and the prototype. In the difference image, pixel values will be one, i.e., ON, where the image element and the prototype have different bit values, and the pixel values will be zero, i.e., OFF, where the image element and the prototype have the same bit values.

If the image element or the prototype includes vector graphics, generating the difference image can include geometrical calculations to determine non-overlapping regions between the image element and the prototype. Alternatively, the system can generate the difference image without determining non-overlapping regions, e.g., by calculating local differences only for a predetermined set of locations, e.g., as specified by a raster defined for the difference image. For grayscale or color images, local differences in the difference image (e.g., pixel values) can be mapped to binary values according predetermined rules (e.g., by mapping the differences to values between zero and one, and rounding the mapped differences). Alternatively, local differences can be allowed to take more than two values and ON pixels can be defined by pixel values that are above a threshold.

The system evaluates the difference image based on the relative arrangement of ON pixels (step 340). By considering the relative arrangement of ON pixels, the evaluation depends on shapes of clusters of ON pixels in the difference image. That is, the system can differentiate between two difference images that have the same number of clusters and in which corresponding clusters have the same masses (i.e., same number of ON pixels) but one or more of the corresponding clusters have different shapes (i.e., different relative arrangement of ON pixels).

The system evaluates the difference image by calculating one or more characteristic parameters based on the difference image. In one implementation, the system identifies each cluster in the difference image and evaluates for each cluster a parameter that depends on the shape of the cluster. For example, the system can calculate a characteristic linear measure (e.g., a diameter or a perimeter) of a cluster and normalize the linear measure with the mass of the cluster. If the normalized linear measure is used to evaluate difference images, compact and disperse clusters with the same mass will be evaluated differently.

In an alternative implementation, compact and disperse clusters are differentiated by evaluating local neighborhoods instead of entire clusters in the difference image. Techniques for evaluating local neighborhoods are discussed with reference to FIGS. 4 and 5. By evaluating local neighborhoods, the evaluation can be sensitive to cluster shapes, e.g., compact and disperse clusters are evaluated differently, without identifying clusters or calculating masses or shapes of clusters.

Based on the evaluation of the difference image, the system decides whether the image element matches the class prototype (decision 350). In one implementation, the system evaluates the difference image with a total score, e.g., as discussed with reference to FIG. 4, and compares the total score with a global threshold value. If the total score is smaller than the global threshold value, the system decides that the image element matches the class prototype. For bitmap difference images, the global threshold value can be set to be proportional to (e.g., 25 percent of) the total number of pixels in the class prototype.

Alternatively or in addition to a total score, the system can decide whether the image element matches the class prototype based on local neighborhoods in the difference image. For example in a bi-level difference image, ON pixels can indicate substantial difference between the image element and the class prototype, and each ON pixel's neighborhood (e.g., nearest neighbors) can be evaluated to calculate the number of other ON pixels in the neighborhood. If the number of other ON pixels in the neighborhood is larger than a local threshold for any of the ON pixels in the difference image, the system decides that the image element does not match the class prototype. The local threshold can be set to a percentage (e.g., 5 percent) of ON pixels in the prototype, a percentage (e.g., 5 percent) of OFF pixels in the prototype, a preset absolute value (e.g., 10), or a minimum, a maximum, or a combination of two or more such values.

If the image element matches the class prototype ("Yes" branch of decision 350), the system classifies the image element as a member of the class represented by the prototype (step 370). If the image element does not match the class prototype ("No" branch of decision 350), the system verifies whether there are more classes and corresponding class prototypes defined for the image (decision 360). For example, the system can have a symbol memory where all class prototypes for the image are stored, and the system can verify whether all class prototypes have been considered for classifying the image element. If there are more classes ("Yes" branch of decision 360), the system compares the image element with another class prototype (i.e., returns to step 320).

In alternative implementations, the image element is compared with all class prototypes that are defined for the image before classifying the image element. For example, if the image element matches a class prototype according to the decision 350, instead of classifying the image element as a member of the class of the prototype, the image element is considered as a candidate for membership in the class. Thus the image element can be a candidate for membership in more than one class. After considering all classes of the image, the system selects one of the classes for which the image element is a candidate for membership, and classifies the image element as a member of the selected class. To select from the candidate classes, the system can compare evaluations of the corresponding difference images and choose the class that provides the smallest difference according to the evaluation. Optionally, a class's prototype can be updated after classifying an image element as a new member of the class. For example, an updated prototype can be based on a weighted average of the old class prototype and the new member.

If the image element and the class prototype do not match and there are no more classes defined for the image ("No" branch of decision 360), the system creates a new class for the image (step 380) and classifies the image element as a member of the new class (step 390). The system can create a new class by defining a prototype for the new class. For example, the system can define the image element as the prototype of the new class. Alternatively, the system can define a prototype for the new class by modifying the image element, e.g., filtering out high frequency components of the image element.

Figure 4:
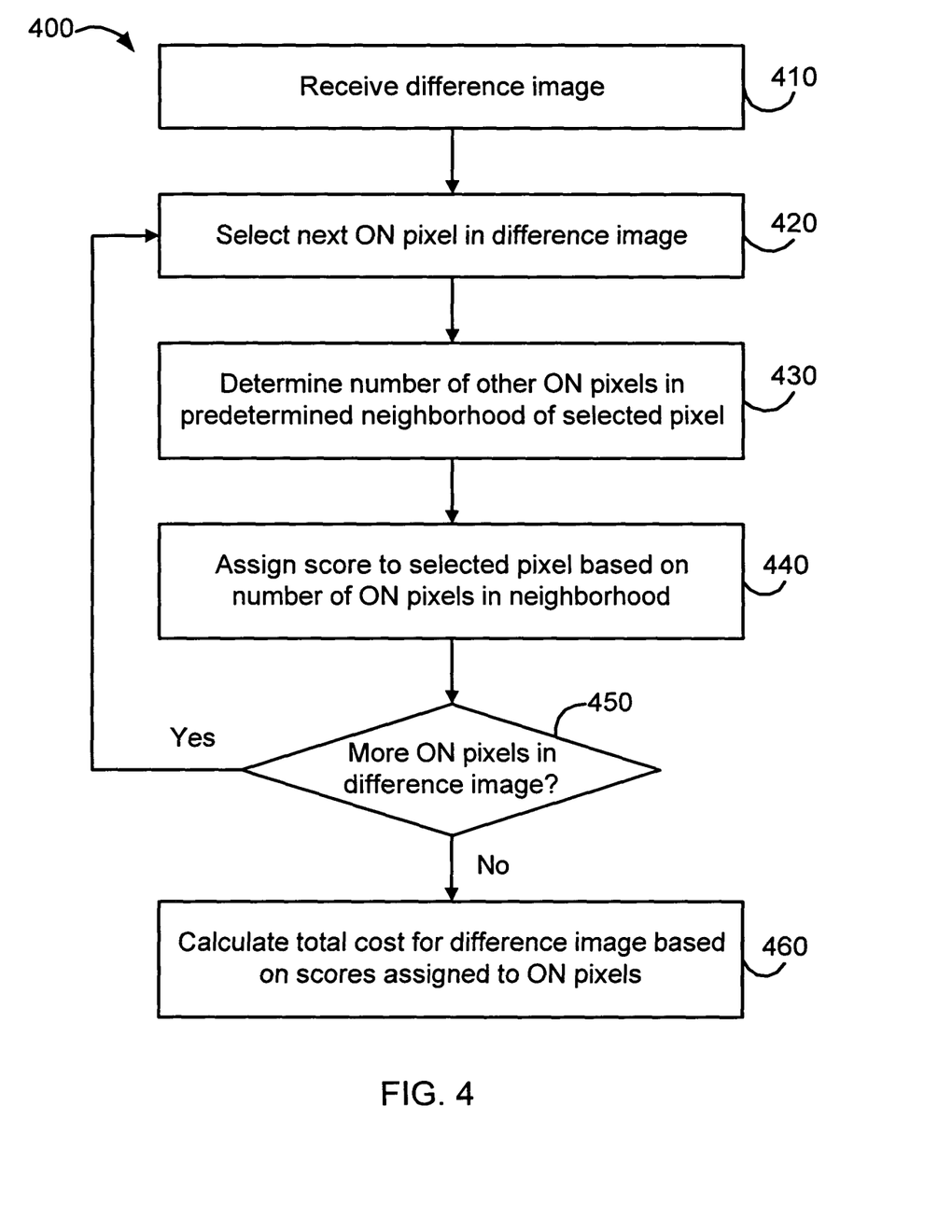

FIG. 4 illustrates a method 400 for evaluating a difference image. The method 400 can be performed, e.g., by a system that includes a difference image evaluator such as the difference image evaluator 114 (FIG. 1). The system receives a difference image (step 410). The difference image is rasterized to provide a raster array of pixels that include ON and OFF pixels representing the presence and absence, respectively, of substantial local differences between two objects, such as an image element and a class prototype. In alternative implementations, the system can receive a non-rasterized (e.g., a vector graphics) difference image and rasterize the received image. The difference image can be received from a difference image generator (such as the difference image generator 112 in FIG. 1), or from any other source, including local or remote storage devices and computer applications.

The system selects a next ON pixel in the difference image (step 420). For example, the system can systematically scan the raster array until the next ON pixel is found. The system determines a number of other ON pixels in a predetermined neighborhood of the selected pixel (step 430). The predetermined neighborhood can be defined by a region whose center is the selected pixel. For example in a rectangular raster array, the neighborhood can be specified by a square of n-by-n pixels (n being an odd integer), such as a 3-by-3 square that specifies a neighborhood including eight nearest neighbor pixels, or as a 5-by-5 square that specifies a neighborhood including second nearest neighbors as well (a total of 24 pixels). Optionally, the predetermined neighborhood can be asymmetric about the selected pixel, e.g., near the edges of the difference image.

The system assigns a score to the selected pixel based on the number of ON pixels in the predetermined neighborhood (step 440). In one implementation, the assigned score is calculated according to a cost function that is a monotonically increasing function of the number of ON pixels in the neighborhood. For example, the cost function can include a power law contribution (such as x to the power p, where x denotes the number of ON pixels in the neighborhood and p is a positive number, e.g., p can be larger than two) and/or an exponential contribution (such as a to the power x, a being a number that is larger than 1, e.g., a can be 2).

The number of ON pixels in the neighborhood, and therefore the assigned score, is sensitive to cluster shapes in the difference image. For pixels in a compact cluster of ON pixels, most of the pixels will have a neighborhood that includes many other ON pixels from the same cluster, and the corresponding assigned score will be large. On the other hand, for pixels in a disperse cluster, most of the pixels will have a neighborhood that includes only a few other ON pixels from the same cluster, and the corresponding assigned score will be small. An exemplary cost function and shape dependence of the score are discussed in more detail with reference to FIG. 5.

In alternative implementations, scores can be assigned to pixels in gray level and color difference images. For example, ON pixels can be defined as pixels whose gray level value is above a predefined on-threshold, and the score can be based on the number of such ON pixels in the neighborhood. Alternatively, the neighborhood can be characterized by calculating a sum of gray values of all ON pixels in the neighborhood, and the calculated sum can be used in place of the number of ON pixels.

The system verifies whether the difference image includes more ON pixels, i.e., ON pixels that have no assigned score (decision 450). If there are more ON pixels without an assigned score ("Yes" branch of decision 450), the system selects a next ON pixel (i.e., returns to step 420). If a score has been assigned to all ON pixels in the difference image, the system calculates a total cost for the difference image based on the scores assigned to the ON pixels (step 460). For example, the total cost can be a sum of all the assigned scores. Alternatively or in addition, the total cost can depend on a maximum of the pixel scores or ON pixel scores that are above a threshold value. Because the scores assigned to the pixels are sensitive to shapes of clusters in the difference image, the total score will be sensitive to cluster shapes as well.

Based on the total cost, the system can evaluate the differences represented by the difference image. For example as discussed above with reference to FIG. 4, if the total cost is below a global threshold, the differences can be evaluated as corresponding to matching symbols. Alternatively or in addition, the system can evaluate the differences represented by the difference image as corresponding to non-matching symbols if any of the pixel scores is above a local threshold value.

FIG. 5 illustrates examples 510-550 of evaluations of clusters based on the number of ON pixels in a neighborhood of pixels in the cluster. The examples 510-550 show clusters of ON pixels (represented by stars) corresponding to clusters on a square raster (not shown). In this example, the neighborhood of a pixel is defined as the nearest neighbors of the pixel in all eight directions (i.e., up, down, left, right, up-left, up-right, down-left, and down-right) on the square raster. Based on a number of ON pixels ("NOP") in the neighborhood, scores are assigned to each ON pixel of the clusters according to a cost function that specifies a score that exponentially grows with the number of ON pixels in the neighborhood. For a particular NOP in the neighborhood of a pixel, the cost function specifies a score of 2 to the power of NOP (i.e., $2^{NOP}$), which is assigned to the pixel. For each cluster, a total score is calculated as a sum of the scores assigned to each of the ON pixels in the cluster.

The example 510 shows a cluster of a single ON pixel. For the single pixel, the neighborhood includes no other ON pixels (i.e., NOP=0); therefore the assigned score is $2^0$=1, which is also the total score of the cluster. The example 520 shows two clusters, a horizontal cluster 521 and a vertical cluster 522, where each cluster consists of two ON pixels (i.e., each cluster has a mass of two pixels). For each of the clusters 521 and 522, each ON pixel has one other ON pixel in its neighborhood (i.e., NOP=1), and each ON pixel is therefore assigned a score of $2^1$=2, giving a total score of four for each of the clusters 521 and 522. While the clusters 521 and 522 have different orientations, their shape is identical, as the vertical cluster 522 can be obtained by a symmetry operation, a 90-degree rotation, from the horizontal cluster 521. Another cluster of two ON pixels can be generated by a 45-degree rotation (not shown) from the horizontal cluster 521. As symmetry operations do not change the shape of a cluster, a total score is the same for cluster that are related by symmetry operations.

The example 530 shows clusters 531-535, each of which consists of three ON pixels (i.e., has a mass of three pixels). A horizontal cluster 531 includes two "end pixels" and one "middle pixel" arranged along a line. Each of the two end pixels has only one other ON pixel (the middle pixel) in its corresponding neighborhood (i.e., NOP=1), and the middle pixel has both end pixels in its neighborhood (i.e., NOP=2). Accordingly, the horizontal cluster has a total score of 8 (=$2^1+2^2+2^1$). The clusters 532-535 all have a similar "L" shape related to each other by rotations and/or reflections. In the clusters 532-535, each ON pixel has two other ON pixels in its corresponding neighborhood (i.e., NOP=2), and therefore each of these clusters has a total score of 12 (=$2^2+2^2+2^2$).

The horizontal cluster 531 has a shape (a line) that is different from the shape (an L) of any of the clusters 532-535, and as a result, the horizontal cluster 531 has a total score (8) that is different from the total score (12) of any of the clusters 532-535. Thus the evaluation of the clusters 531-535 is sensitive to the shape of the clusters, even though each of the clusters 531-535 has the same mass (i.e., three pixels). In particular, the horizontal cluster 531 has a smaller total score because it is more disperse (having a maximum spread of three pixels) than the clusters 532-535 (which have a maximum spread of two pixels). Because the evaluation of the clusters 531-535 is based on a local neighborhood of the ON pixels, these clusters can be evaluated without actually identifying the clusters or calculating a mass or a linear spread of the clusters.

The example 540 shows clusters 541-545, each of which consists of four ON pixels (i.e., has a mass of four pixels) and has a different shape. The cluster 541 has the most disperse shape (a line) and the smallest total score (i.e., 12) among the clusters 541-545. The cluster 545, on the other hand, has the most compact shape (a square) and the largest total score (i.e., 32) among the clusters 541-545. For example, the cluster 541 can represent a difference between two horizontal lines that have different thickness, and the cluster 545 can represent a difference between an "i" and an "l." Between the most disperse and the most compact shape, the total score changes by almost a factor of three that allows a classifier to recognize the two horizontal lines as members of the same class while recognizing the "i" and the "l" as members of different classes.

The example 550 shows clusters 551-555, each of which consists of five ON pixels (i.e., has a mass of five pixels) and has a different shape. The cluster 551 has the most disperse shape (a line) and the smallest total score (i.e., 16) among the clusters 551-555. The cluster 555, on the other hand, has the most compact shape (close to a square) and the largest total score (i.e., 52) among the clusters 551-555. That is, the total score changes by more than a factor of three between the most disperse and the most compact shape. However, when using this technique to compare clusters with masses of four and five pixels, the total score changes only by a factor of about one third for the most disperse shape (i.e., a line) and a factor of about two thirds for the most compact shape (i.e., a square). That is, the evaluation used for the examples 510-550 is more sensitive to cluster shapes than to masses of the clusters.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A method for classifying elements of a digital image, the method comprising:
   receiving an element of the digital image and a prototype representing a class of elements;
   generating a difference image representing differences between the received element and the prototype and including a plurality of ON pixels, each ON pixel representing a local difference between the received element and the prototype, wherein the difference image includes one or more clusters of ON pixels, each cluster including one or more neighboring ON pixels;

determining relative arrangements of ON pixels in the difference image;

assigning one or more scores to the difference image using the determined relative arrangements of ON pixels in the difference image;

based on the scores assigned to the difference image, determining whether the received element of the image belongs to the class represented by the prototype; and generating a representation of the digital image, the representation including a symbol map associating one or more elements of the digital image with the prototype of the class.

2. The method of claim 1, further comprising:
identifying one or more of the clusters of ON pixels in the difference image.

3. The method of claim 2, wherein:
determining relative arrangements of ON pixels in the difference image includes, for each identified cluster, determining a relative arrangement of ON pixels in the cluster, the determined relative arrangement specifying a shape for the cluster.

4. The method of claim 3, wherein:
assigning one or more scores to the difference image includes assigning a score to each cluster based on the shape of the cluster.

5. The method of claim 1, wherein:
assigning one or more scores to the difference image includes assigning a score to each ON pixel in the difference image.

6. The method of claim 5, wherein:
assigning a score to each ON pixel includes assigning a score to each ON pixel based on a number of other ON pixels in a predetermined neighborhood of the ON pixel.

7. The method of claim 6, wherein:
assigning a score to each ON pixel includes assigning a score to each ON pixel according to a monotonically increasing function of the number of other ON pixels in the predetermined neighborhood of the ON pixel.

8. The method of claim 7, wherein:
the monotonically increasing function includes an exponential function of the number of ON pixels in the predetermined neighborhood.

9. The method of claim 8, wherein:
the exponential function is two to the power of the number of ON pixels in the predetermined neighborhood.

10. The method of claim 1, wherein:
generating a difference image includes generating a difference image that includes one or more OFF pixels, each OFF pixel representing lack of local difference between the received element and the prototype.

11. The method of claim 1, wherein:
receiving an element of the digital image includes receiving a bitmap image element including neighboring pixels of the same bit value.

12. The method of claim 11, wherein:
receiving a prototype includes receiving a bitmap of the prototype.

13. The method of claim 12, wherein:
generating a difference image includes performing a Boolean exclusive-or operation of each pixel of the bitmap image element with the bitmap of the prototype.

14. The method of claim 1, wherein:
if it is determined that the received element belongs to the class of the prototype, generating a representation of the digital image includes using the symbol map to represent the received element with the prototype of the class.

15. The method of claim 1, wherein:
receiving a prototype representing a class of elements includes receiving a glyph representing a character; and
determining whether the received element belongs to the class represented by the prototype includes determining whether the received element represents the character.

16. The method of claim 15, further comprising:
if it is determined that the received element represents the character, generating a text representation using a character code of the character.

17. The method of claim 16, wherein:
generating a text representation includes using a font that maps the character code to the glyph representing the character.

18. A computer readable medium storing a software product for classifying elements of a digital image, the software product comprising instructions operable to cause one or more data processing apparatus to perform operations comprising:

receiving an element of the digital image and a prototype representing a class of elements;

generating a difference image representing differences between the received element and the prototype and including a plurality of ON pixels, each ON pixel representing a local difference between the received element and the prototype, wherein the difference image includes one or more clusters of ON pixels, each cluster including one or more neighboring ON pixels;

determining relative arrangements of ON pixels in the difference image;

assigning one or more scores to the difference image using the determined relative arrangements of ON pixels in the difference image;

based on the scores assigned to the difference image, determining whether the received element of the image belongs to the class represented by the prototype; and generating a representation of the digital image, the representation including a symbol map associating one or more elements of the digital image with the prototype of the class.

19. The computer readable medium of claim 18, further comprising instructions operable to cause one or more data processing apparatus to perform operations comprising:
identifying one or more of the clusters of ON pixels in the difference image.

20. The computer readable medium of claim 19, wherein:
determining relative arrangements of ON pixels in the difference image includes, for each identified cluster, determining a relative arrangement of ON pixels in the cluster, the determined relative arrangement specifying a shape for the cluster.

21. The computer readable medium of claim 20, wherein:
assigning one or more scores to the difference image includes assigning a score to each cluster based on the shape of the cluster.

22. The computer readable medium of claim 18, wherein:
assigning one or more scores to the difference image includes assigning a score to each ON pixel in the difference image.

23. The computer readable medium of claim 22, wherein:
assigning a score to each ON pixel includes assigning a score to each ON pixel based on a number of other ON pixels in a predetermined neighborhood of the ON pixel.

24. The computer readable medium of claim 23, wherein:
assigning a score to each ON pixel includes assigning a score to each ON pixel according to a monotonically increasing function of the number of other ON pixels in the predetermined neighborhood of the ON pixel.

25. The computer readable medium of claim 24, wherein:
the monotonically increasing function includes an exponential function of the number of ON pixels in the predetermined neighborhood.

26. The computer readable medium of claim 25, wherein:
the exponential function is two to the power of the number of ON pixels in the predetermined neighborhood.

27. The computer readable medium of claim 18, wherein:
generating a difference image includes generating a difference image that includes one or more OFF pixels, each OFF pixel representing lack of local difference between the received element and the prototype.

28. The computer readable medium of claim 18, wherein:
receiving an element of the digital image includes receiving a bitmap image element including neighboring pixels of the same bit value.

29. The computer readable medium of claim 28, wherein:
receiving a prototype includes receiving a bitmap of the prototype.

30. The computer readable medium of claim 29, wherein:
generating a difference image includes performing a Boolean exclusive-or operation of each pixel of the bitmap image element with the bitmap of the prototype.

31. The computer readable medium of claim 18, wherein:
if it is determined that the received element belongs to the class of the prototype, generating a representation of the digital image includes using the symbol map to represent the received element with the prototype of the class.

32. The computer readable medium of claim 18, wherein:
receiving a prototype representing a class of elements includes receiving a glyph representing a character; and
determining whether the received element belongs to the class represented by the prototype includes determining whether the received element represents the character.

33. The computer readable medium of claim 32, further comprising instructions operable to cause one or more data processing apparatus to perform operations comprising:
if it is determined that the received element represents the character, generating a text representation using a character code of the character.

34. The computer readable medium of claim 33, wherein:
generating a text representation includes using a font that maps the character code to the glyph representing the character.

35. A system comprising:
one or more processors;
and one or more computer readable mediums storing a software product for classifying elements of a digital image, the software product comprising instructions operable to cause the one or more processors to perform operations comprising:
receiving an element of the digital image and a prototype representing a class of elements;
generating a difference image representing differences between the received element and the prototype and including a plurality of ON pixels, each ON pixel representing a local difference between the received element and the prototype, wherein the difference image includes one or more clusters of ON pixels, each cluster including one or more neighboring ON pixels;
determining relative arrangements of ON pixels in the difference image;
assigning one or more scores to the difference image using the determined relative arrangements of ON pixels in the difference image;
based on the scores assigned to the difference image, determining whether the received element of the image belongs to the class represented by the prototype; and
generating a representation of the digital image, the representation including a symbol map associating one or more elements of the digital image with the prototype of the class.

36. The system of claim 35, the operations further comprising:
identifying one or more of the clusters of ON pixels in the difference image.

37. The system of claim 36, wherein:
determining relative arrangements of ON pixels in the difference image includes, for each identified cluster, determining a relative arrangement of ON pixels in the cluster, the determined relative arrangement specifying a shape for the cluster.

38. The system of claim 37, wherein:
assigning one or more scores to the difference image includes assigning a score to each cluster based on the shape of the cluster.

39. The system of claim 35, wherein:
assigning one or more scores to the difference image includes assigning a score to each ON pixel in the difference image.

40. The system of claim 39, wherein:
assigning a score to each ON pixel includes assigning a score to each ON pixel based on a number of other ON pixels in a predetermined neighborhood of the ON pixel.

41. The system of claim 40, wherein:
assigning a score to each ON pixel includes assigning a score to each ON pixel according to a monotonically increasing function of the number of other ON pixels in the predetermined neighborhood of the ON pixel.

42. The system of claim 41, wherein:
the monotonically increasing function includes an exponential function of the number of ON pixels in the predetermined neighborhood.

43. The system of claim 42, wherein:
the exponential function is two to the power of the number of ON pixels in the predetermined neighborhood.

44. The system of claim 35, wherein:
generating a difference image includes generating a difference image that includes one or more OFF pixels, each OFF pixel representing lack of local difference between the received element and the prototype.

45. The system of claim 35, wherein:
receiving an element of the digital image includes receiving a bitmap image element including neighboring pixels of the same bit value.

46. The system of claim 45, wherein:
receiving a prototype includes receiving a bitmap of the prototype.

47. The system of claim 46, wherein:
generating a difference image includes performing a Boolean exclusive-or operation of each pixel of the bitmap image element with the bitmap of the prototype.

48. The system of claim 35, wherein:
if it is determined that the received element belongs to the class of the prototype, generating a representation of the digital image includes using the symbol map to represent the received element with the prototype of the class.

49. The system of claim 35, wherein:

receiving a prototype representing a class of elements includes receiving a glyph representing a character; and determining whether the received element belongs to the class represented by the prototype includes determining whether the received element represents the character.

50. The system of claim 49, the operations further comprising:

if it is determined that the received element represents the character, generating a text representation using a character code of the character.

51. The system of claim 50, wherein:

generating a text representation includes using a font that maps the character code to the glyph representing the character.

\* \* \* \* \*

UNITED STATES PATENT AND TRADEMARK OFFICE
CERTIFICATE OF CORRECTION

| | | |
|---|---|---|
| PATENT NO. | : 7,454,067 B2 | Page 1 of 1 |
| APPLICATION NO. | : 10/661078 | |
| DATED | : November 18, 2008 | |
| INVENTOR(S) | : Pati | |

It is certified that error appears in the above-identified patent and that said Letters Patent is hereby corrected as shown below:

On the Title Page

Item [*] Notice:   Subject to any disclaimer, the term of this patent is extended or adjusted under 35 U.S.C. 154(b) by (1039) days Delete the phrase "by 1039 days" and insert -- by 1465 days --

Signed and Sealed this

First Day of June, 2010

David J. Kappos
*Director of the United States Patent and Trademark Office*